United States Patent
Patel et al.

(10) Patent No.: US 12,455,821 B2
(45) Date of Patent: Oct. 28, 2025

(54) MEMORY ACCESS TRACING

(71) Applicant: Intel Corporation, Santa Clara, CA (US)

(72) Inventors: Ankit Patel, Folsom, CA (US); Lidia Warnes, Roseville, CA (US); Donald L. Faw, Hillsboro, OR (US); Bassam N. Coury, Portland, OR (US); Douglas Carrigan, Chandler, AZ (US); Hugh Wilkinson, Newton, MA (US); Ananthan Ayyasamy, Beaverton, OR (US); Michael F. Fallon, Wellesley, MA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 17/849,387

(22) Filed: Jun. 24, 2022

(65) Prior Publication Data
US 2022/0334963 A1   Oct. 20, 2022

Related U.S. Application Data

(60) Provisional application No. 63/252,018, filed on Oct. 4, 2021.

(51) Int. Cl.
*G06F 12/06*    (2006.01)
*G06F 12/0868*  (2016.01)
*G06F 12/0877*  (2016.01)

(52) U.S. Cl.
CPC ...... *G06F 12/0646* (2013.01); *G06F 12/0868* (2013.01); *G06F 12/0877* (2013.01)

(58) Field of Classification Search
CPC ............. G06F 12/0646; G06F 12/0868; G06F 12/0877; G06F 11/3037; G06F 11/3419; G06F 11/3466; G06F 12/0284
See application file for complete search history.

(56) References Cited

U.S. PATENT DOCUMENTS

| | | | |
|---|---|---|---|
| 2007/0011330 A1* | 1/2007 | Dinker | G06F 11/3409 714/E11.2 |
| 2021/0034499 A1* | 2/2021 | Hershkovitz | G06F 11/3466 |
| 2022/0075731 A1* | 3/2022 | Dong | G06F 9/5022 |
| 2022/0197819 A1* | 6/2022 | Kumar | G06F 12/109 |

OTHER PUBLICATIONS

Ohba, Nobuyuki et al., "Non-intrusive Scalable Memory Access Tracer", https://link.springer.com/chapter/10.1007/978-3-319-10696-0_20, QEST 2014, pp. 245-248.
Schmidt, Thomas, "Evaluating Techniques for Full System Memory Tracing", https://os.itec.kit.edu/downloads/ba_2017_Thomas-Schmidt_Techniques-for-full-system-memory-tracing.pdf, Oct. 2017, 41 pages.

* cited by examiner

*Primary Examiner* — Zhuo H Li
(74) *Attorney, Agent, or Firm* — Compass IP Law PC (57) ABSTRACT

Examples described herein relate to circuitry, when operational, configured to: store records of memory accesses to a memory device by at least one requester based on a configuration, wherein the configuration is to specify a duration of memory access capture. In some examples, the at least one requester comprises one or more workloads running on one or more processors. In some examples, the configuration is to specify collection of one or more of: physical address ranges or read or write access type.

18 Claims, 7 Drawing Sheets

| clk # | 0 | 1 | | | 3 | 4 |
|---|---|---|---|---|---|---|
| event | RD | RD | | | RD | RD |
| packet # | 1 | 2 | | | 3 | 4 |
| Trace | RD-0nop | RD-0nop | | | RD-1nop | RD-0nop |
| NOP field | 0 | 0 | | | 1 | 0 |

404

| clk # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| event | RD | RD | | | | | | | | | | | | | | | | WR | RD | WR |
| packet # | 1 | 2 | | | | | | | | | | | | | | | | 3 | 4 | 5 |
| Trace | RD-0nop | RD-0nop | | | | | | | | | | | | | | | | WR-15nop | RD-0nop | WR-0nop |
| NOP field | 0 | 0 | | | | | | | | | | | | | | | | 15 | 0 | 0 |

406

| clk # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|---|---|
| event | RD | RD | | | | | | | | | | | | | | | | | | | | | | | | | | | | | | | NOP | RD | WR |
| packet # | 1 | 2 | | | | | | | | | | | | | | | | | | | | | | | | | | | | | | | 3 | 4 | 5 |
| Trace | RD-0nop | RD-0nop | | | | | | | | | | | | | | | | | | | | | | | | | | | | | | | NOP-30nop | RD-0nop | WR-0nop |
| NOP field | 0 | 0 | | | | | | | | | | | | | | | | | | | | | | | | | | | | | | | 30 | 0 | 0 |

MEMORY ACCESS TRACING

RELATED APPLICATION

This application claims priority to U.S. Provisional Application No. 63/252,018, filed Oct. 4, 2021. The entire contents of that application are incorporated by reference in its entirety.

BACKGROUND

With an increase in complexity of hardware and software applications, software utilization of underlying hardware is useful to improve hardware performance. Understanding cycle accurate memory access patterns by workloads can be useful to improve a next generation of memory controllers and central processing unit (CPU) designs. Built in memory tracing feature enables to capture memory access patterns in real world production environment for later analysis. Existing memory tracing utilize logic analyzers, instruction tracing, or Intel® Performance Counter Monitor (PMON) capabilities.

DETAILED DESCRIPTION

At least to provide for configurable time duration of memory access pattern capture, configurable circuitry can capture memory access patterns directed to a memory device for one or more cycles and store trace data arising from execution of workloads. Trace data can include one or more of: read access, write access, command, address, and timestamp. At boot time or runtime, configurable circuitry and its capability to generate trace data can be identified and configured by a basic input/output system (BIOS), operating system (OS), driver, or application as to which memory accesses are to be captured. An application in user space can configure tracing capabilities by provide a configuration. A configuration can include one or more of: duration (e.g., number of seconds), memory address range, requester identifier, address of trace buffer in memory, and other information. Configurable circuitry can compress and encrypted captured trace data in a buffer. In some cases, even if the memory device is idle, circuitry can store captured memory access patterns. The circuitry can capture cycle accurate memory access patterns in a disaggregated memory pool, where the disaggregated memory pool incudes one or more memory devices, storage devices, or persistent memory devices. Disaggregated memory pool can include memory devices (e.g., dual inline memory modules (DIMMs)), storage devices, or persistent memory devices that are on different circuit boards, different servers, different racks and can be accessed via a network.

A software developer, hardware designer, or datacenter administrator can access the captured trace data to determine how memory device was utilized by a workload under test compared to average telemetry metrics over a sample interval. An operation of a memory device can be modified based on trace data. For example, pre-fetching of data into cache or to memory that is nearer to the requester can occur based on memory access patterns.

For example, circuitry can perform one or more of: support tracing of memory accesses from multiple hosts or silicon level IPs to common memory pool, and local memory; filter trace data collection based on host physical address ranges, access type (read/write) or other access attributes across multiple hosts or devices; trace accesses to data structures shared among multiple hosts or devices; correlate high-resolution timestamps on trace data from multiple hosts or devices; trace memory accesses at full rate without requiring special purpose hardware or without changing system or without changing workload under test; perform tracing in a trusted production environment within a managed security boundary; perform tracing in a trusted production environment implemented by a privileged out-of-band management agent; store trace data a trace buffer in otherwise unallocated memory in the system memory pool; store trace data in an encrypted trace buffer in a trusted memory system; or dynamically adjust a size of trace buffer(s), buffer modes (e.g., first in first out (FIFO), ring buffer), or trace data access (e.g., in-band, out-of-band, post-trace, or during tracing activity).

Figure 1:
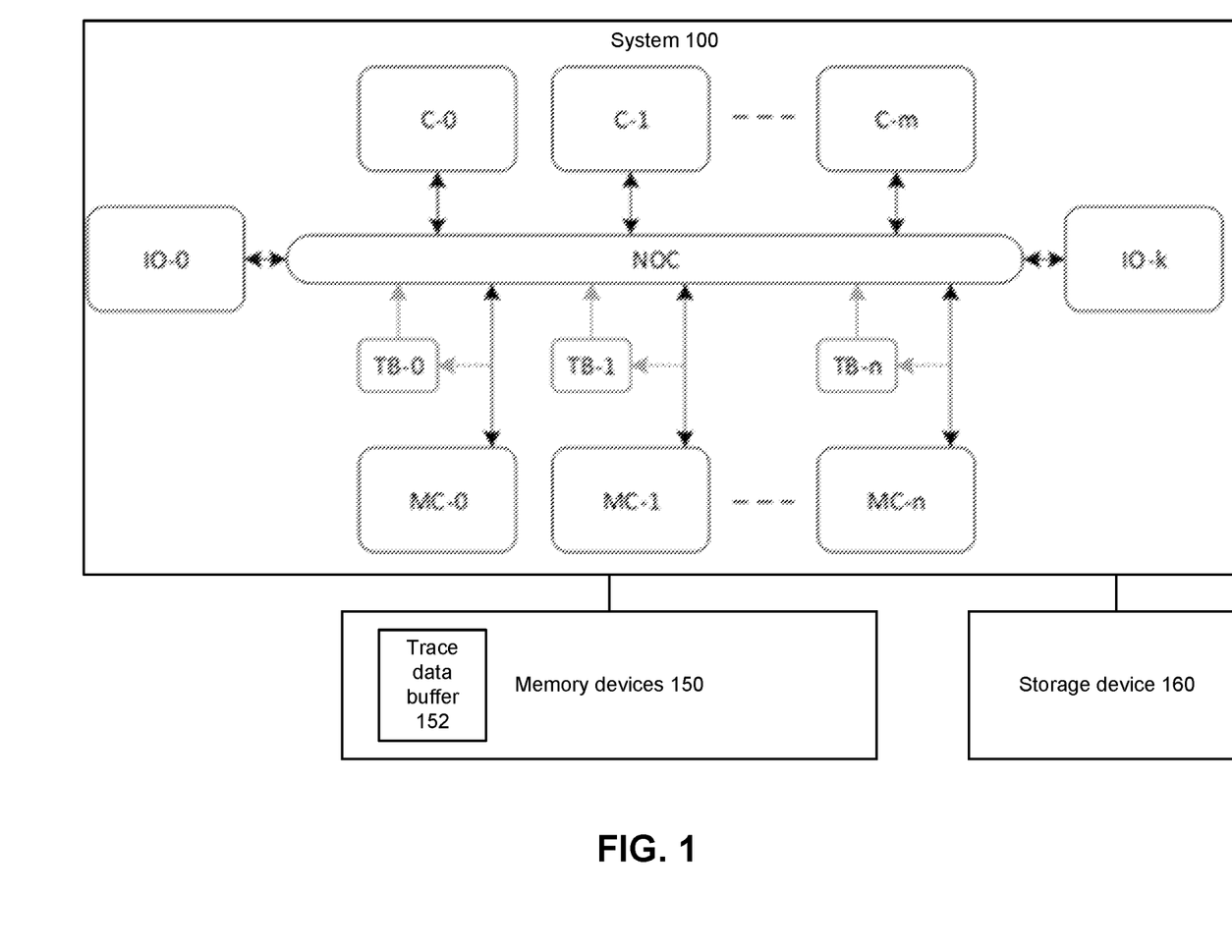
FIG. 1 depicts an example system.

FIG. 1 depicts an example system. System 100 can include one or more central processing unit (CPU) cores or other devices (e.g., C-0 to C-m, where m is an integer), memory controllers (e.g., MC-0 to MC-n, where n is an integer), and input/output (IO) circuitries (e.g., IO-0 to IO-k, where k is an integer) can be communicatively coupled together by a switch, fabric, interconnect or bus (e.g., network on chip (NOC)).

One or more memory controllers can receive memory access requests (e.g., read or write) and cause data to be read from or written to at least one of memory devices 150. Memory devices 150 can include one or more of: volatile, non-volatile memory devices, dual in-line memory modules (DIMMs), one or more of memory pools. At least two levels of memory (alternatively referred to herein as "2LM" or tiered memory) can be used that includes cached subsets of system disk level storage (in addition to, for example, run-time data). This main memory includes a first level (alternatively referred to herein as "near memory") including smaller faster memory made of, for example, dynamic random access memory (DRAM) or other volatile memory; and a second level (alternatively referred to herein as "far memory") which includes larger and slower (with respect to the near memory) volatile memory (e.g., DRAM) or non-volatile memory storage (e.g., flash memory or byte addressable non-volatile memory (e.g., Intel Optane®)). The far memory can be presented as "main memory" to the host operating system (OS), while the near memory can include a cache for the far memory that is transparent to the OS. The management of the two-level memory may be performed by a combination of circuitry and modules executed via the host central processing unit (CPU). Near memory may be coupled to the host system CPU via high bandwidth, low latency connection for low latency of data availability. Far memory may be coupled to the CPU via low bandwidth, high latency connection (as compared to that of the near memory), via a network or fabric, or a similar high bandwidth, low latency connection as that of near memory. Far memory devices can exhibit higher latency or lower memory bandwidth than that of near memory. In some examples, near memory can include memory devices 150 and a far memory can include storage device 160.

As described herein, tracing block circuitry (e.g., TB-0 to TB-n, where n is an integer) can be configured to capture and store tracing data related to memory access patterns issued by one or more memory controllers or sent to one or more memory controllers. A memory access pattern can include one or more of: read access, write access, command, virtual or physical address range, and timestamp. Tracing block circuitry can assign timestamps to trace data associated with multiple hosts, devices, or processes. Tracing block circuitry can trace accesses to data structures shared among one or more hosts, devices, or processes, where the data structures in stored in a memory pool and/or memory. One or more tracing block circuitries can determine what trace data to collect based on one or more of: physical address ranges, time ranges, access type (read/write) or other access attributes issued from one or more cores or received via IO circuitries.

Tracing block circuitry could be associated with devices with specific product and stock keeping units (SKUs) to track memory uses by such devices. Devices (e.g., C-0 to C-m) can include comprises one or more of: microcontroller, central processing unit (CPU), graphics processing unit (GPU), network interface device, accelerator, storage device, memory device, memory controller, graphics processing unit, audio or sound processing device.

In some examples, as described herein, a tracing block circuitry can capture and store one or more tracing data described in the following Table 1.

TABLE 1

| Example tracing data | Example content |
| --- | --- |
| Event Type | Cycles dropped indicating memory access requests (e.g., read or write) that cannot be captured. Non-operation (NOP) indicating memory device is in a Long Idle or Idle state. Power Down indicating no clock available to tracing block circuitry or memory device. |
| Timer | NOP clock count indicating a number of clock cycles passed since last encoded packet or trace data stored in trace buffer. NOP clock count can indicate a timer value or incremental number of clock cycles passed since last encoded packet or trace data stored in trace buffer. |
| Cache line address or special counter value | Tracked requested cache line address, memory address, or page address. |
| Requester identifier | Host identifier or process identifier. Unique value for up to 16 hosts. |

A memory address range associated with memory 150 can be reserved as trace data buffer 152 to store trace data blocks. Trace data stored in trace buffer 152 can be encrypted and/or compressed. In some examples, tracing block circuitries can encrypt and/or compress trace data that is stored. Although a single trace data buffer 152 is shown, multiple different trace data buffers can be allocated where a buffer is allocated for different configurations and/or requester identifiers. Memory allocated to a trace data buffer can be released for general compute usage or another trace data buffer after trace data is copied to storage or otherwise released. For example, storage could be located in a system under test or an external host system for analysis.

Tracing can be performed in a trusted production or customer use environment within a managed security boundary. Tracing can be performed in a trusted production environment implemented by a privileged out-of-band management agent. In some examples, trace data block circuitry of system 100 and trace data buffer 152 can be allocated in a confidential computing environment or secure enclave for which accesses to memory regions associated with a process is restricted to authorized devices or processes and data is stored in encrypted form. A confidential computing environment or secure enclave can be created using one or more of: total memory encryption (TME), multi-key total memory encryption (MKTME), Trusted Domain Extensions (TDX), Double Data Rate (DDR) encryption, function as a service (FaaS) container encryption or an enclave/TD (trust domain), Intel® SGX, Intel® TDX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment.

Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader) configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system can access portions of memory that are not encrypted by TME.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. Processes can be cryptographically isolated from each other in memory with separate encryption keys which can be used in multi-tenant cloud environments. Processes can also be pooled to share an individual key, further extending scale and flexibility.

Configuration of tracing block circuitry to perform memory tracing can be performed by a BIOS, firmware, or software stack. Firmware code, BIOS, driver, and/or API implement security features (e.g., silicon level, protocol level, device level, systems level and cloud stack security requirements) to ensure that only trusted services and agents with necessary permissions can use tracing and access the trace data. During boot time, the firmware code can enable or disable tracing feature based on firmware settings. When enabled, at runtime, a kernel/OS level driver can expose an API to control configuration of tracing from an application layer. Application layer tracing can be configured to capture memory access traces in trace data buffer 152 based on configurations, as described herein. A trace collection application executed by a processor can manage trace data collection into trace data buffer 152 at runtime, e.g., trace offload location, filtering ranges if any, etc. One or more of the following can be dynamically adjusted at initialization or during runtime: a size of trace buffer 152 and buffer modes (e.g., first in first out (FIFO), ring buffer), or trace data access (e.g., in-band, out-of-band, post-trace, or during tracing activity). When tracing is completed, contents of one or more trace data buffers associated with particular tracked processes or hosts can be copied from trace data buffer 152 to storage for analysis.

Figure 2:
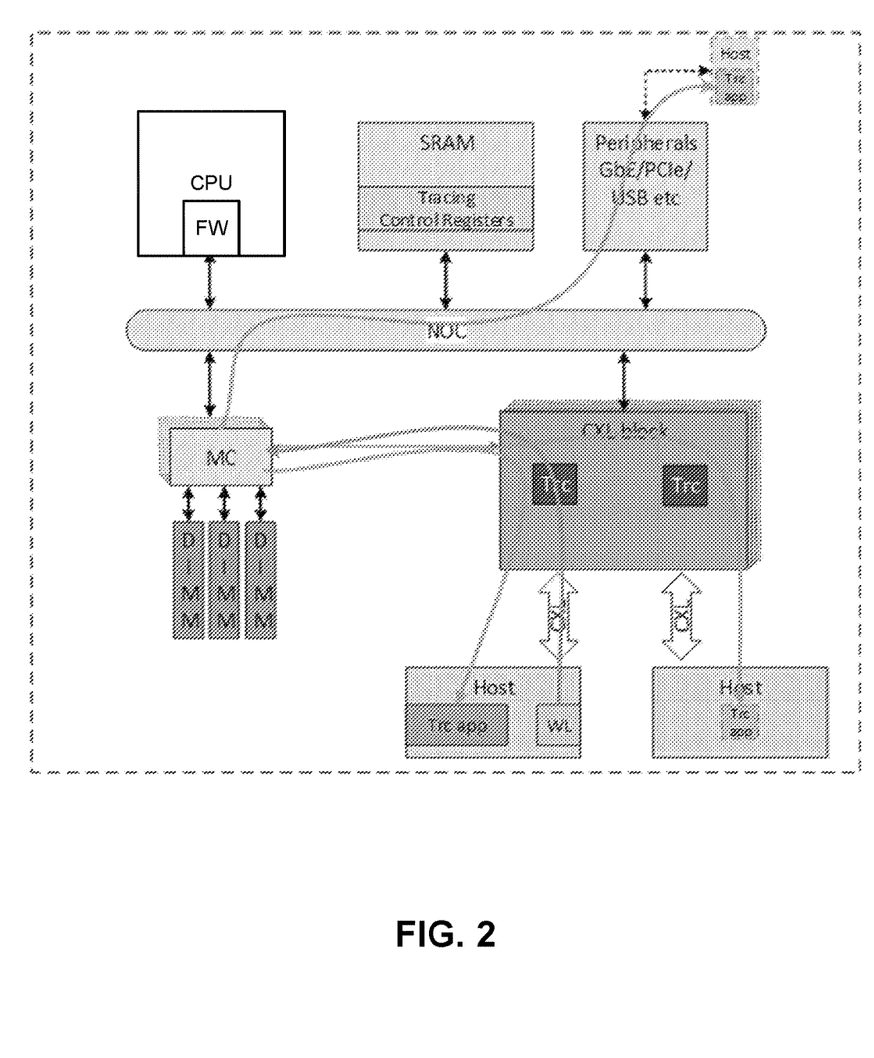
FIG. 2 depicts an example process.

FIG. 2 depicts an example operation of a system. In this example, multiple hosts execute tracing applications (Trc app). A pre-tracing configuration operation performed by an agent with privileges via firmware (FW) can load tracing related settings (e.g., host identifiers, trace buffer pointers, and so forth) into control registers. For example, an agent with privileges can include a tracing application, driver, orchestrator, or others. FW can provide a secure interface to update Tracing Control Registers. Control registers can include a set of registers that track status bits, command bits and pointers. In some examples, one or more sets of registers can be allocated per tracing block circuitry (Trc) or per host.

Tracing block circuitry (Trc) can be associated with one or more hosts. Trc can encode trace data arising from memory accesses over a time window into one or more packets and write the one or more packets into buffer. Tracing can begin after control register is updated and tracing can track memory access data for an executed workload (WL). Tracing can end after a control register updated via FW or if a tracing buffer is full. A tracing application (Trc), driver, orchestrator, or other software with privileges can start and end tracing via FW.

After tracing ends, stored trace data can be copied to storage and control registers can be updated to indicate a Trc is ready for another tracing session. Trace data can be copied to a host attached to a memory pool via a Compute Express Link (CXL) (e.g., CXL.mem) link or peripheral input output interfaces (IOs) with privileges. A tracing application, operating system (OS), driver, orchestrator with privileges can cause the copying of trace data to storage.

Figure 3:
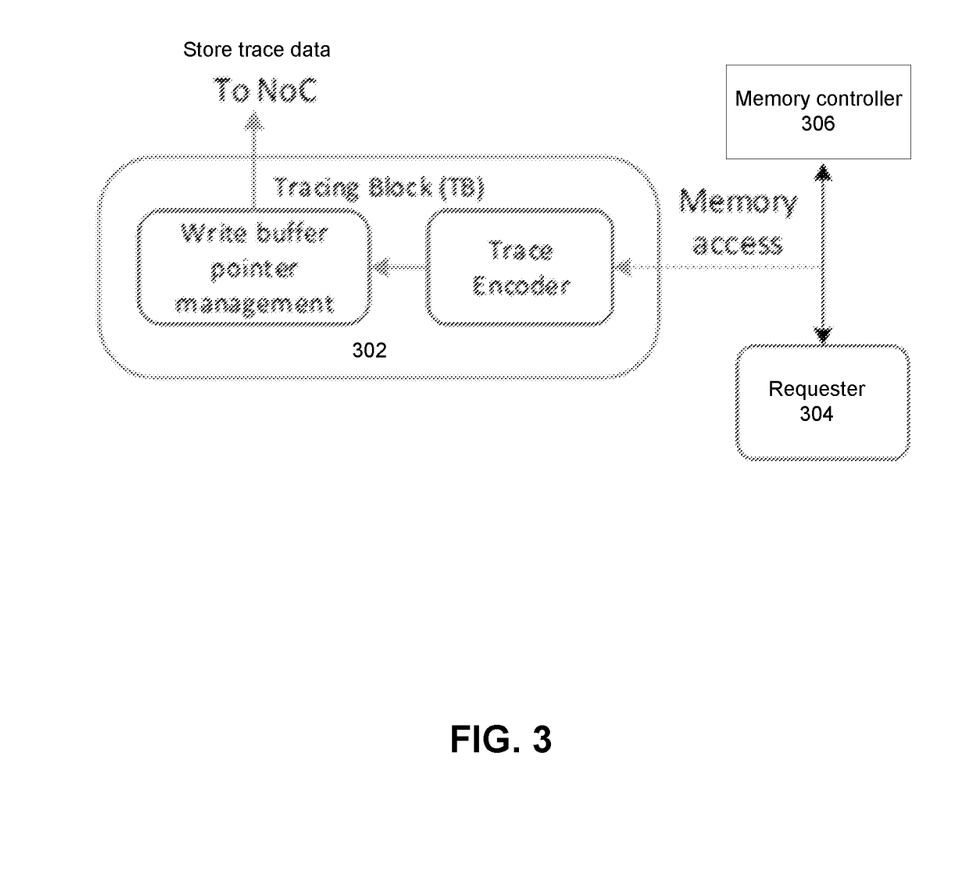
FIG. 3 depicts an example system.

FIG. 3 depicts an example tracing block circuitry. Tracing block circuitry 302 can be associated with a memory access (e.g., read or write) requester 304 (e.g., host, server, device, or process). Two or more tracing block circuitries can be associated with a requester in some examples. A driver/application interface can configure and control tracing block circuitries 302 separately or together as needed.

When configured, tracing block 302 can record memory access information in one or more clock cycles issued from requester 304 and encode access patterns as trace data and provide the trace data into one or more packets. Tracing block 302 can be configured to capture specific type of accesses or accesses over a time window. An encoded packet can be sent to a trace buffer for storage.

Tracing block 302 can be granted a level of permission and security settings to write to particular buffers in memory or storage via NoC. Trusted agents and services can configure and control tracing blocks 302 in some examples. Tracing block 302 can comply with protocol level and device level security requirements. Tracing block 302 may not interfere with memory accesses, or on the system or workload under test. Tracing block 302 can intercept memory access requests or a requester 304 can transmit the memory access requests to tracing block 302 and tracing block 302 can forward memory access requests to a target memory controller. In some examples, requester 304 can send a memory access request to tracing block 302 and to memory controller 306 so that requester 304 sends two copies of the memory access request or at least addresses and commands (e.g., read or write) of the memory access request.

Trace data can be encoded in a packet and store in a trace data buffer. A packet can be 64-bits or other sizes. Packets can be omitted for some cycles without losing memory access details for those cycles if trace data is a same as that sent in one or more packets sent in one or more prior cycles. This encoding feature can conserve NoC bandwidth and storage data without any information loss.

Tracing block 302 can be configured for use in a variety of systems. For example, tracing block 302 and its tracing of memory accesses can be used for memory access requests sent to a memory controller, memory access requests sent to a memory controller hub, memory access requests sent to a pooled memory controller hub, memory access requests sent to a graphics and memory controller hub, memory access requests sent to a chipset, memory access requests sent to a bridge such as a CXL consistent bridge.

Figure 4:
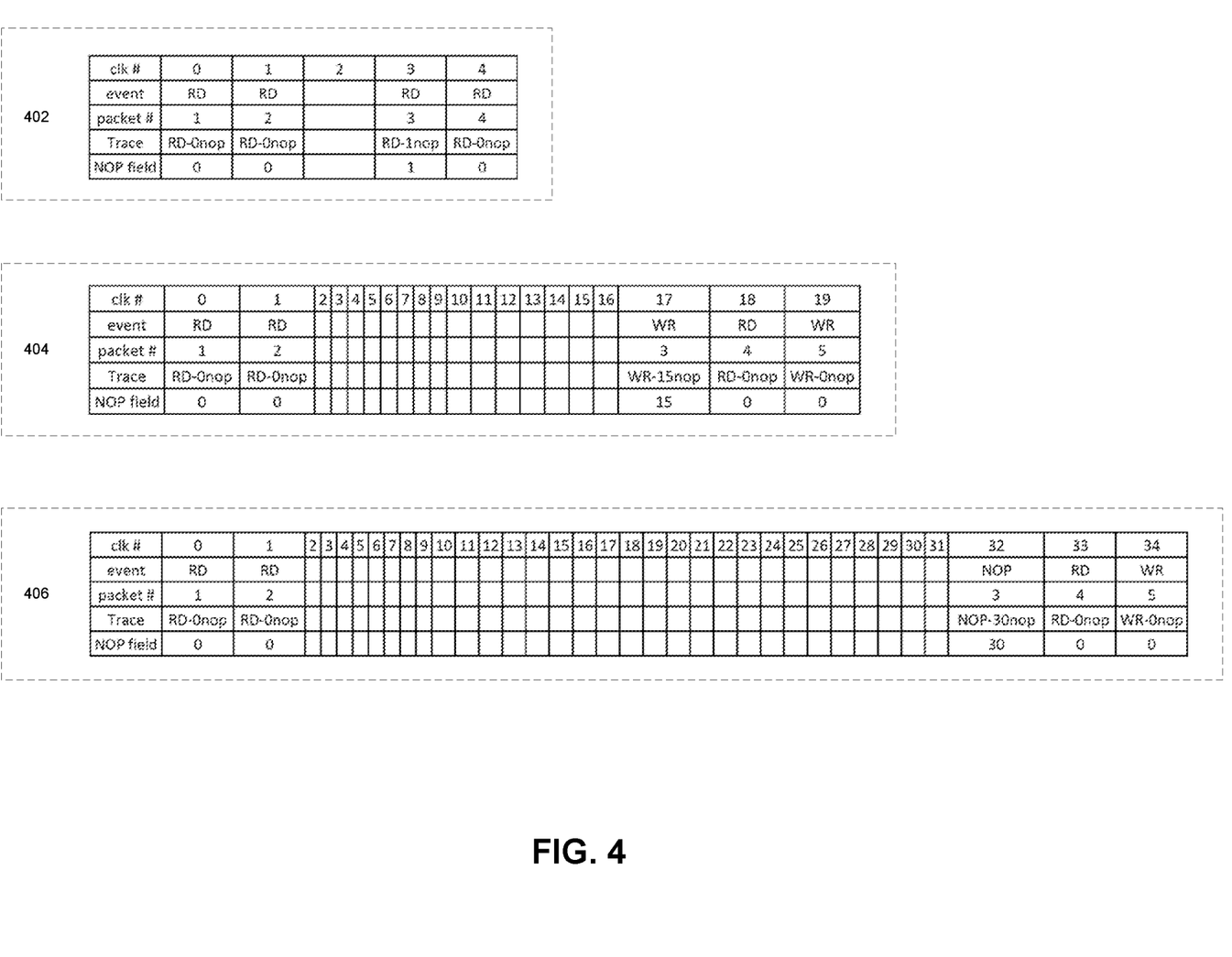
FIG. 4 depicts an example of traced memory access data.

FIG. 4 depicts an example of memory trace data. One or more memory trace data can be recorded in one or more trace packets. Examples of data in at least one trace packet can include one or more of the following fields: clk #, event, packet #, or NOP field. Field clk # can record a clock cycle number or elapsed number of clock cycles for an event. Field event can identify a type of event encoded in a trace packet such as read (RD), write (WR), or no operation (NOP) during a number of clock cycles specified in NOP field. Note that RD and WR can also record one or more addresses associated with respective read or write operations. Field packet # can identify a sequence number of the trace packet. Field NOP field can identify a number of NOPs that are encoded into the trace packet and this information can be recorded in the Trace row in the form of <number>nop.

Field Trace can identify information encoded in the trace packets based on event and NOP field and the information in Trace may not be separately provided in a trace packet. In some examples, Trace can indicate a number of clock cycles of NOP (e.g., no traced read or write operations) after a read or write operation. For example, RD-0nop can indicate zero clock cycles of NOP after a read operation. For example, WR-1nop can indicate one clock cycle of NOP after a write operation.

Portions of trace data 402-406 can be stored in memory for subsequent access for different requester devices or processes. Trace data 402 can include one or more of: clock number (#), event, packet #, Trace, and NOP information for clock cycles 0-4. In this example, events for cycles 0, 1, 3, and 4 include respective read (RD), RD, RD, and RD but there was no traced memory access operation recorded for clock cycle 2. Packets used to store event data for cycles 0-4 are packet numbers 1-4. NOP fields for clock cycles 0 and 1 can indicate RD-0nop to indicate a read operation was traced with no intervening no operation whereas NOP field for clock cycle 2 is blank as no operation was recorded. Clock cycles inferred from trace packets 3 and 4 can indicate respective RD-1nop and RD-0nop to indicate a read operation in clock cycle 3 followed a no operation in clock cycle 2 and a read operation in clock cycle 4 followed another operation (read) in clock cycle 3. Clock cycles 0, 1, and 4 inferred from packets 1, 2 and 4 are zero as there was no operation prior to read operations in clock cycles 0, 1, and 4, whereas NOP field for packet 3 is 1 to indicate a single clock cycle of no operation prior to the read operation for clock cycle 3. Packet fields for clock cycles 0, 1, 3, and 4 indicate packets 1-4 capture trace data.

Trace data 404 can include one or more of: clock number (#), event, packet #, Trace, and NOP information for clock cycles 0-19. Trace data 404 records events or no events for clock cycles 0 to 19. Trace data for clock cycles 0 and 1 are the same as in that of trace data 402. There is no recorded trace data for clock cycles 2-16. Trace data for clock 17 indicates no operation of 15 clock cycles before a write operation by indicating event of WR, Trace of WR-15nop, and NOP field of 15. Packet # for clock cycle 17 is 3 and stores trace data for clock cycle 17. Trace data for clock cycle 18 is contained in packet number 4, and it captured a read operation with a traced operation in a prior clock cycle (17). Trace data for clock cycle 19 indicates a packet number 5 captured a write operation with a traced operation in a prior clock cycle (18).

Trace data 406 can include one or more of: clock number (#), event, packet #, Trace, and NOP information for clock cycles 0-34. Trace data 406 records events or no events for clock cycles 0 to 34. Trace data for clock cycles 0 and 1 are the same as in that of trace data 402. There is no recorded trace data for clock cycles 2-31. For durations of no operations beyond a threshold, trace data indicates a number of prior no operations using a NOP event. The threshold can be based on a number of bits available to store a number of no operation clock cycles. Limiting a number of number of bits available to store a number of no operation clock cycles can reduce bandwidth and memory used to store a number of no operation clock cycles. Trace data for clock 32 indicates no operation of 30 clock cycles in a packet 3 by indicating clock cycle 32 included a NOP event, with Trace of NOP-30nop and NOP field of value 30. Trace data for clock cycle 33 is packet number 4 captured a traced read operation with an operation in a prior clock cycle (32). Trace data for clock 34 is a packet number 5 captured a traced write operation with an operation in a prior clock cycle (33).

Figure 5:
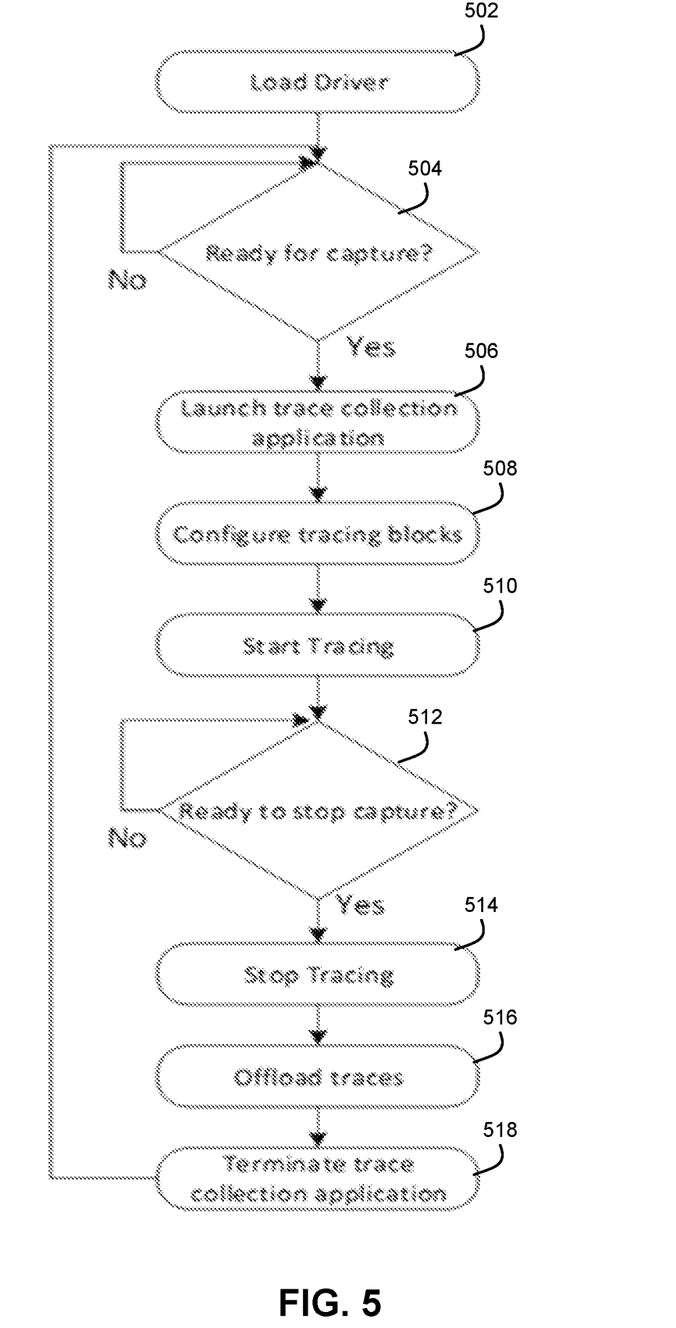
FIG. 5 depicts an example process.

FIG. 5 shows a flow diagram showing how built-in memory tracing feature could be used during runtime. At 502, once a system is booted with memory tracing feature, the driver can enable an API interface. The API interface can be accessed to write trace configurations for one or more trace block circuitries. At 504, a determination can be made if trace data is ready for capture. Trace data can be ready for capture based on a tracer being configured to start tracing memory access requests targeted to a traced address or address range or when a user or administrator indicates to start tracing memory access requests to a traced address or address range. If trace data is ready for capture, the process can proceed to 506. If trace data is not ready for capture, the process can repeat 504.

At 506, the trace collection application can be launched manually or in an automated manner within trusted boundaries. There can be multiple tracing application running simultaneously to use one or different tracing blocks. The software stack can support remote configuration and control of the configuration of tracing blocks.

At 508, tracing blocks can be configured based on a configuration written-to by a tracing application. At 510, tracing of memory accesses specified by the configuration can be performed. At 512, a determination can be made if capture can stop. For example, if a buffer that stores trace data or a time period of tracing has completed, capture can stop and the process can proceed to 514. At 514, tracing can stop. At 516, trace data can be copied to a memory or storage from a trace data buffer for access or analysis. At 518, trace collection application can be terminated. Use of trace data can improve next generation of memory controllers and central processing unit (CPU) designs as well as designs of applications and orchestrators to improve efficient utilization of memory devices. Use of trace data can be used to migrate data based on frequency of access. Data that is more frequently accessed can be migrated to near memory whereas data that is less frequently accessed can be migrated to far memory.

Figure 6:
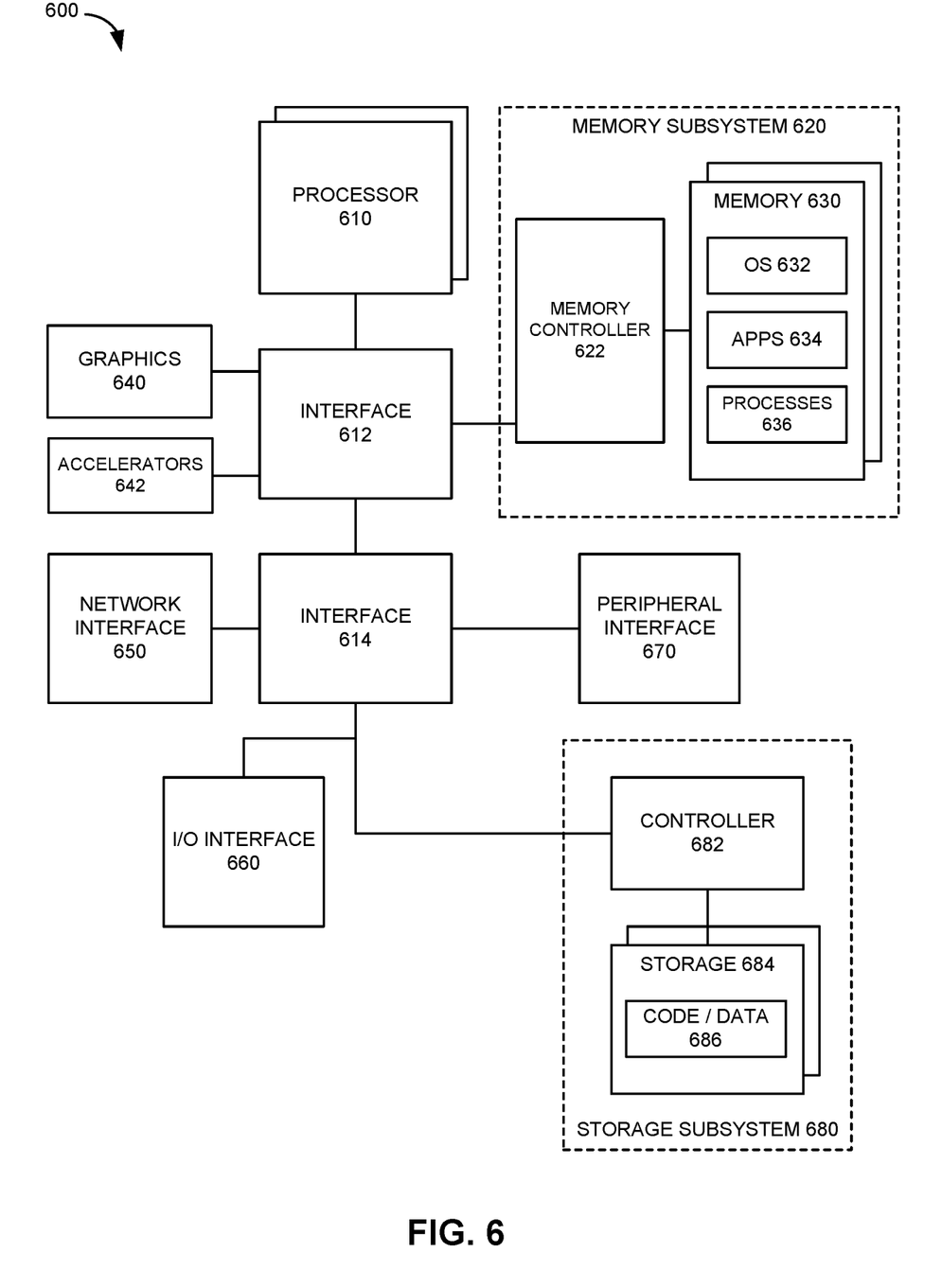
FIG. 6 depicts an example system.

FIG. 6 depicts an example computing system. Components of system 600 (e.g., processor 610, accelerators 642, network interface 650, and so forth) can utilize tracing block circuitry to capture trace data, as described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function or programmable offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue read or write commands associated with memory addresses to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory.

Network interface 650 can include one or more of: a network interface controller (NIC), a remote direct memory access (RDMA)-enabled NIC, Infrastructure Processing Unit (IPU), data processing unit (DPU), SmartNIC, router, switch, or network-attached appliance. Some examples of network interface 650 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614. Storage 684 can include a flash-based solid-state drives (SSDs).

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network that provides die-to-die communications; chip-to-chip communications; circuit board-to-circuit board communications; and/or package-to-package communications. A die-to-die communications can utilize Embedded Multi-Die Interconnect Bridge (EMIB) or an interposer.

Figure 7:
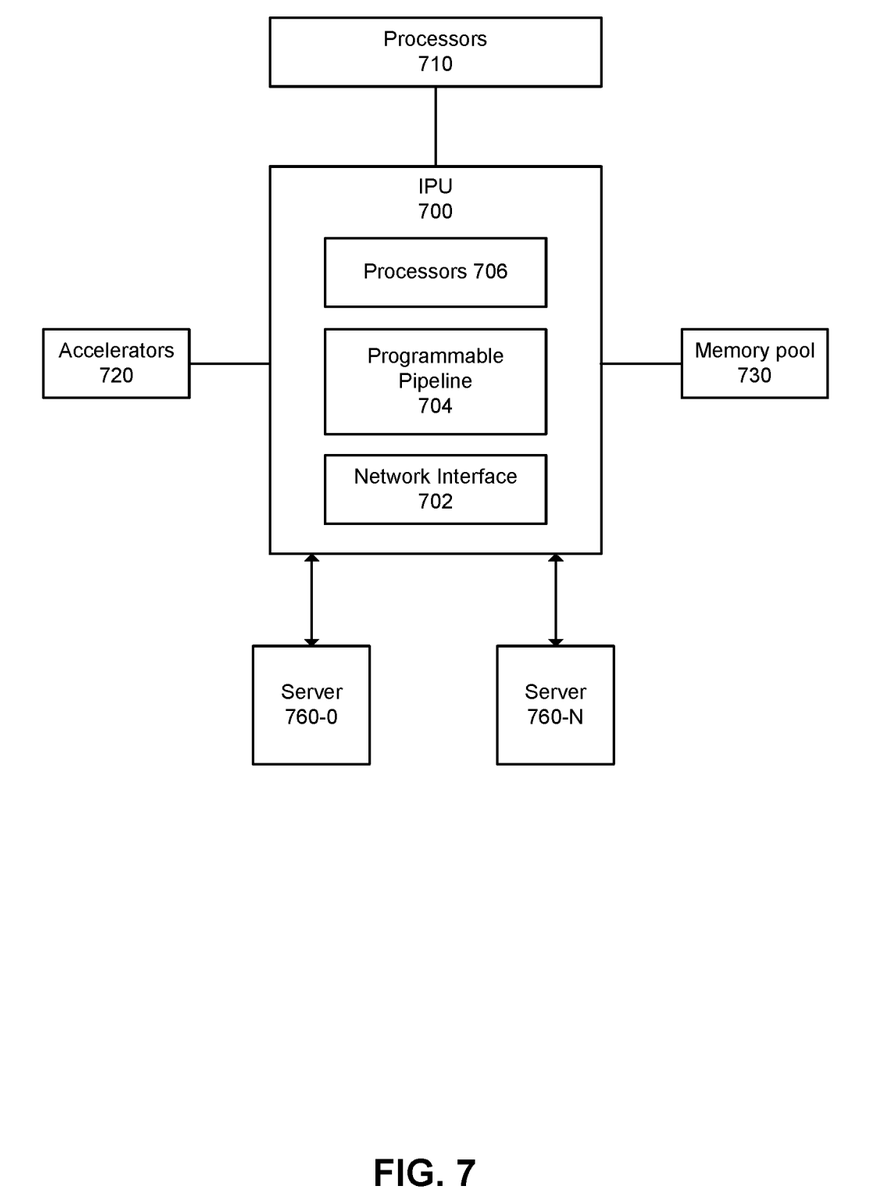
FIG. 7 depicts an example system.

FIG. 7 depicts an example system. In this system, IPU 700 manages performance of one or more processes using one or more of processors 706, processors 710, accelerators 720, memory pool 730, or servers 740-0 to 740-N, where N is an integer of 1 or more. In some examples, processors 706 of IPU 700 can execute one or more processes, applications, VMs, containers, microservices, and so forth that request performance of workloads by one or more of: processors 710, accelerators 720, memory pool 730, and/or servers 740-0 to 740-N. IPU 700 can utilize network interface 702 or one or more device interfaces to communicate with processors 710, accelerators 720, memory pool 730, and/or servers 740-0 to 740-N. IPU 700 can utilize programmable pipeline 704 to process packets that are to be transmitted from network interface 702 or packets received from network interface 702.

In some examples, tracing circuitry can be used at least for tracing accesses by processors 706, processors 710, accelerators 720, programmable pipeline 704, network interface 702, or one or more of server 760-0 to 760-N. In some examples, tracing circuitry can be used at least for tracing accesses to memory pool 730, processors 706, processors 710, accelerators 720, programmable pipeline 704, network interface 702, or one or more of server 760-0 to 760-N. In some examples, processors 706, processors 710, accelerators 720, programmable pipeline 704, or network interface 702 can utilize tracing data to cause migration of data that is more frequently accessed to memory that is physically closer to a requester processor or application and/or migrate data that is less frequently accessed to memory or storage that is physically further from a requester processor or application or has higher latency of access than a memory device that stores the data.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, content delivery networks (CDNs), and/or hybrid data centers (e.g., data center that use virtualization, cloud and software-defined networking to deliver application workloads across physical data centers and distributed multi-cloud environments). Various examples can be utilized by a Cloud Service Provider (CSP) or communication service provider (CoSP).

Various examples of tracing may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: circuitry, when operational, configured to: store records of memory accesses to a memory device by at least one requester based on a configuration, wherein the configuration is to specify a duration of memory access capture.

Example 2 includes one or more examples, wherein the at least one requester comprises one or more workloads running on one or more processors.

Example 3 includes one or more examples, wherein the memory device comprises at least one memory pool.

Example 4 includes one or more examples, wherein the configuration is to specify collection of one or more of: physical address ranges or read or write access type.

Example 5 includes one or more examples, wherein the records comprise one or more of: trace information of accesses of memory addresses and time between accesses of memory addresses.

Example 6 includes one or more examples, wherein the records comprise one or more of: requester identifier, read request, write request, memory address, cache line address, page address, event type, time stamp of capture, or timer value at capture.

Example 7 includes one or more examples, wherein the event type comprises one or more of: memory access requests not captured, memory device is idle or non-operational, or no power to memory device.

Example 8 includes one or more examples, wherein the circuitry is coupled to at least one memory controller and at least one interconnect and is to receive memory accesses transmitted to the at least one memory controller and at least one interconnect.

Example 9 includes one or more examples, wherein the circuitry and the memory device are associated with a security boundary and the circuitry is permitted merely to store records of memory accesses to the memory device.

Example 10 includes one or more examples, and includes the memory device; a memory controller; and an interconnect, wherein: the at least one requester comprises at least one device coupled to the memory controller and the memory device through the interconnect and the circuitry is coupled to the memory controller through the interconnect.

Example 11 includes one or more examples, wherein the at least one device comprises one or more of: microcontroller, central processing unit (CPU), graphics processing unit (GPU), network interface device, accelerator, storage device, graphics processing unit, audio or sound processing device.

Example 12 includes one or more examples, and includes a method comprising: storing records of memory accesses to a memory device by at least one requester based on a configuration, wherein the configuration is to specify a duration of memory access capture.

Example 13 includes one or more examples, wherein the configuration is to specify collection of one or more of: physical address ranges or read or write access type.

Example 14 includes one or more examples, wherein the records comprise one or more of: trace information of accesses of memory addresses and time between accesses of memory addresses.

Example 15 includes one or more examples, wherein the records comprise one or more of: requester identifier, read request, write request, memory address, cache line address, page address, event type, time stamp of capture, or timer value at capture.

Example 16 includes one or more examples, wherein the event type comprises one or more of: memory access requests not captured, memory device is idle or non-operational, or no power to memory device.

Example 17 includes one or more examples, and includes a computer-readable medium comprising instructions stored thereon, that if executed by one or more processors, cause the one or more processors to: configure circuitry to store records of memory accesses to a memory device by at least one requester based on a configuration, wherein the configuration is to specify a duration of memory access capture.

Example 18 includes one or more examples, wherein the configuration is to specify collection of one or more of: physical address ranges or read or write access type.

Example 19 includes one or more examples, wherein the records comprise one or more of: requester identifier, read request, write request, memory address, cache line address, page address, event type, time stamp of capture, or timer value at capture.

Example 20 includes one or more examples, wherein the records comprise one or more of: trace information of accesses of memory addresses and time between accesses of memory addresses.

What is claimed is:

1. An apparatus comprising:
   a hardware interconnect to communicatively couple at least one device and a memory via a memory controller and
   circuitry, when operational, configured to:
      trace requests for memory access to the memory from multiple requesters and
      store records of the memory accesses to the memory based on a configuration, wherein:
         the configuration is to specify a duration of memory access capture for the multiple requesters, requester identifier to track memory accesses, physical address ranges, or read or write access type,
         the multiple requesters are associated with the at least one device,
         the records of the memory accesses comprise a requester identifier and two or more of: event type, time value of elapsed duration since storage of data in a buffer, or address,
         the memory comprises a memory pool, and
         the memory pool comprises at least one dual inline memory module (DIMM).

2. The apparatus of claim 1, wherein the multiple requesters comprise workloads executing on the at least one device.

3. The apparatus of claim 1, wherein the event type comprises one or more of: memory access requests not captured, memory device is idle or non-operational, or no power to memory device.

4. The apparatus of claim 1, wherein the circuitry and the memory are associated with a security boundary and the circuitry is permitted merely to store records of memory accesses to the memory.

5. The apparatus of claim 1, comprising:
   the memory and
   the memory controller.

6. The apparatus of claim 1, wherein the at least one device comprises one or more of: a microcontroller, central processing unit (CPU), graphics processing unit (GPU), network interface device, accelerator, storage device, graphics processing unit, audio or sound processing device.

7. A method comprising:
   an interconnect to a network on chip (NOC), that communicatively couples at least one device and a memory via a memory controller, wherein the interconnect performs:
      storing records of memory accesses to the memory by at least one requester based on a configuration, wherein:
         the configuration is to specify a duration of memory access capture, requester identifier to track memory accesses, physical address ranges, or read or write access type,
         the at least one requester is associated with the at least one device, and
         the records of the memory accesses comprise a requester identifier and two or more of: event type, time value of elapsed duration since storage of data in a buffer, or memory address.

8. The method of claim 7, wherein the records comprise one or more of: identifier of read request, identifier of write request, cache line address, page address, time stamp of capture, or timer value at capture.

9. The method of claim 8, wherein the event type comprises one or more of: memory access requests not captured, memory device is idle or non-operational, or no power to memory device.

10. The method of claim 7, comprising:
pre-fetching data from the memory based on the records of the memory accesses for processing by a requester of the at least one requester.

11. The method of claim 7, comprising:
the interconnect intercepting a request for a memory access of the memory accesses from a requester of the at least one requester and performing the storing the records of the memory accesses to the memory based on the intercepted request.

12. The method of claim 7, wherein the interconnect is to operate in a manner consistent with Compute Express Link (CXL).

13. The method of claim 7, wherein the records of memory accesses are to indicate a number of clock cycles of no operations (NOP).

14. The method of claim 7, wherein the records of memory accesses are stored in trace data and wherein the trace data indicates a clock cycle number, an event information, packet number, and indication of no operation (NOP).

15. At least one non-transitory computer-readable medium comprising instructions stored thereon, that if executed by one or more processors, cause the one or more processors to:
configure circuitry to store records of memory accesses to a memory device by at least one requester based on a configuration, wherein:
the configuration is to specify a duration of memory access capture,
the circuitry communicatively couples at least one device and a memory via a memory controller,
multiple requesters are associated with the at least one device,
the records of the memory accesses comprise a requester identifier and two or more of: event type, time value of elapsed duration since storage of data in a buffer, or address, and
the memory comprises a memory pool and the memory pool comprises at least one dual inline memory module (DIMM).

16. The computer-readable medium of claim 15, wherein the configuration is to specify collection of one or more of: physical address ranges or read or write access type.

17. The computer-readable medium of claim 15, wherein the records comprise one or more of: read request, write request, memory address, cache line address, page address, event type, time stamp of capture, or timer value at capture.

18. The computer-readable medium of claim 15, wherein the records comprise one or more of: trace information of accesses of memory addresses and time between accesses of memory addresses.

* * * * *